Patented Nov. 16, 1937

2,099,550

UNITED STATES PATENT OFFICE 2,099,550

ANTIRACHITIC VITAMIN

Adolf Windaus, Goettingen, and Friedrich Schenck, Wuppertal-Elberfeld, Germany, assignors to Winthrop Chemical Company, Inc., New York, N. Y., a corporation of New York No Drawing. Application March 5, 1937, Serial No. 129,188. In Germany March 20, 1935

11 Claims. (Cl. 260—153)

This invention relates to a new synthetic antirachitic vitamin and to a process of preparing the same in a pure and crystalline state.

Formerly the opinion generally formed in the art was that ergosterol is the only sterol compound which can be antirachitically activated. The activatability of other sterols to a certain extent was considered as being always due to a small content of ergosterol. Recently one of us discovered that among the three different dihydro derivatives of ergosterol which are obtained by acting upon ergosterol with various reducing agents, the 22.23-dihydro-ergosterol can still be antirachitically activated by ultra-violet irradiation, whereas the two other dihydroderivatives of ergosterol are not activatable. Also in this case the activatable product is derived from ergosterol. It was then our idea to convert sterols which contain one double bond in ring II of the sterol ring system

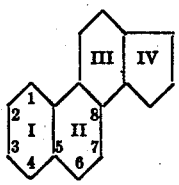

for instance, cholesterol, into the corresponding 7-dehydro-sterols, that is into compounds which merely differ from the initial sterols by the presence in the said ring II of a second double bond in conjugated position to the double bond already present, and it was our intention to investigate the behaviour of such 7-dehydro-sterol compounds to ultra-violet irradiation. We actually succeeded in manufacturing such new 7-dehydrosterol compounds containing conjugated double bonds in the said ring II, particularly when starting with cholesterol, sitosterol and stigmasterol. The manufacture of the 7-dehydro-sterols obtainable in this manner has been set forth in detail in our co-pending application for Letters Patent Serial No. 69,590, filed March 18, 1936. The present application is a continuation in part of the said parent application. The parent application discloses already our discovery that 7-dehydrocholesterol is converted by the usual ultra-violet irradiation into an antirachitically active product which we call "Vitamin $D_3$". Accordingly, the said transformation of cholesterol into 7-dehydrocholesterol results in a provitamin. This new result is the more important since it is the first time that a sterol which as such has no provitamin properties, is transformed by chemical reactions into a product which, same as ergosterol or certain products derived therefrom, can be antirachitically activated by the usual ultra-violet irradiation. The present application particularly refers to this new antirachitically active transformation product of 7-dehydro-cholesterol and to a process of preparing the same in a chemically uniform and even crystalline state.

7-dehydro-cholesterol, which is a chemically uniform and in its pure state crystalline substance melting at 150° C., is transformed into an antirachitically highly active amorphous product by the usual irradiation processes, for instance, by irradiation with a quartz mercury vapor lamp, or with a magnesium spark. The activity of the amorphous irradiation product is characterized by a marginal dose of about $0.1\gamma$, that is to say 1 mg. of the said amorphous transformation product of 7-dehydro-cholesterol contains about 10,000 International vitamin D units as compared with the International standard preparation. The activity of the amorphous transformation product which is directly obtained in the irradiation process varies to a certain extent, depending on the particular irradiation conditions. In view of its high activity the amorphous product which is directly obtained from the irradiation of 7-dehydro-cholesterol may be used for therapeutic purposes.

In accordance with another feature of our present invention the said amorphous irradiation product may be converted into a chemically uniform and crystalline state. The crystals of the new antirachitically active product melt at 82–84° C., have a rotation power $$[\alpha]_D^{20} + 83°$$

in acetone solution and an absorption maximum at 265 mu. The formula $C_{27}H_{44}O$ results from the analysis of the crystalline product. One international unit of antirachitic activity is contained in only $0.025\gamma$ of the crystalline product, in other words, 1 mg. of the crystalline product contains 40,000 International units of the antirachitic vitamin as established by the International standardization method. This high degree of activity of the new antirachitic vitamin prepared by a chemical process from a product which in its pure state is not at all activatable seems to be similar to the activity of the crystalline vitamin $D_2$ obtained by ultra-violet irradiation of ergosterol. But actually there is a very important difference between our new vitamin $D_3$, that is the antirachitically active transformation product of 7-dehydro-cholesterol, and the well-known vitamin $D_2$ obtained from ergosterol. If vitamin $D_2$ and vitamin $D_3$ are used in equivalent rat doses in the treatment of the leg weakness of chickens it results that the equivalent rat dose of vitamin $D_3$ is about 80 to 100 times more active with the chickens than the corresponding rat dose of the well-known vitamin $D_2$. The properties of our new vitamin $D_3$ clearly prove that this vitamin is differentiated from vitamin $D_2$ not only by its genesis from an originally inactive sterol and its different chemical formula and physical properties, but that there is also an important difference in its physiological activity.

The irradiation process is preferably carried out with ultra-violet light in the customary manner, for instance, by means of a quartz mercury vapor lamp, or by a magnesium spark. The 7-dehydro-cholesterol is advantageously dissolved in a liquid hydrocarbon, for instance, benzene, benzine, ligroin, n-pentane, alcohol, ether, or the like. The solutions are introduced into the quartz vessel, oxygen being excluded as much as possible. The irradiation time depends on the strength and distance of the ultra-violet light source from the products to be irradiated and on the quantity of this product. Further details will be seen from the examples. After irradiation has taken place the solvent is advantageously distilled off in vacuo. The amorphous product thus obtainable shows the high antirachitic activity indicated above and therefore may be used directly for therapeutic purposes, but it obviously still contains a certain quantity of the unchanged initial material and perhaps small quantities of by-products formed in the irradiation products. In view of the therapeutic utility of the irradiation product it is of course advisable to isolate from the amorphous irradiation product the antirachitically active transformation product of the 7-dehydro-cholesterol in a chemically pure state. Our experiments have shown that the usual recrystallization processes are not very successful in this respect. It is possible to remove a certain quantity of the unchanged 7-dehydro-cholesterol still present in the irradiation product from solutions of the irradiation product in organic solvents, for instance, alcohol, on cooling. However, the starting material is not completely removed in this manner. It further has been found that on treatment of an alcoholic solution of the irradiation product with digitonin, digitonin forms a difficultly soluble addition product only with the unchanged 7-dehydro-cholesterol, whereas the transformation product of 7-dehydro-cholesterol remains in the solution. The said purification steps, however, allow of a purification only to a certain extent. We have tried to attain better results by the esterification of the irradiation product. In that case the formation of an ester of the unchanged 7-dehydro-cholesterol was to be expected. It was, however, not certain whether the antirachitically active transformation product would also yield an ester in such esterification process. On esterification of the irradiation product with meta-dinitrobenzoyl-chloride, with 3,5-dinitro-4-methyl-benzoylchloride respectively, we first obtained the corresponding ester of the unchanged 7-dehydro-cholesterol. From the more soluble parts of the esterification product contained in the mother liquor we were able to obtain the meta-dinitro-benzoic acid ester of the antirachitically active transformation product of 7-dehydro-cholesterol in a chemically pure and crystalline state. On saponification of this ester, preferably by alcoholic alkali solution, first the alkali metal salt of the meta-dinitro-benzoic acid separates. After filtration the vitamin is obtained from the filtrate in a rather pure state, showing an activity of about 20,000 International vitamin D units in 1 mg. of the dry substance. This product could be converted into a crystalline product by redissolving it from organic solvents, preferably alcohols, such as methyl alcohol, by cooling the solution to temperatures of about —10 to —20° C. Crystallization may be completed by the addition of small quantities of water to the alcoholic solution. The crystals thus obtained have the properties described above. Depending on the irradiation conditions, sometimes difficulties arise to obtain the products referred to above in the crystalline state merely by the esterification process. In such cases apart from the separation of unchanged 7-dehydro-cholesterol by means of digitonin or treatment with organic solvents as indicated above, the irradiation product may be treated with an acid anhydride of the maleic acid anhydride type at normal temperature in indifferent solvents, such as benzene, benzine, ether, petroleum ether or mixtures thereof for a prolonged time, say for several days; under these conditions the antirachitically active product does not combine with the said anhydride, so that those parts of the irradiation product which combine with the anhydride may be separated from the mixture in the form of salts of the addition compounds after splitting up the acid anhydride by saponification.

As another auxiliary method for fractionating the irradiation product of 7-dehydro-cholesterol into its various components the so-called adsorption analysis may be used (compare "Zeitschrift for Physiologische Chemie" 220 (1933) page 247). The irradiation product may be subjected to this adsorption analysis prior to or after esterification. Likewise the product obtained after saponification of the ester may be subjected to the adsorption analysis. The adsorption analysis is preferably carried out while using a column of aluminium oxide as the adsorbing agent. When a solution of the esterified or non-esterified mixture of the saponification product is conducted through the said adsorption column, the antirachitically active component, its ester respectively, will be found in the lower parts of the aluminium oxide adsorbing column or even in the filtrate if the adsorbing column is sufficiently washed by the solvent.

The purification effect attained by the several steps referred to above may be controlled by testing the antirachitic activity of the various fractions on animals. Likewise the ultra-violet absorption of the several fractions may be used in this respect, having in mind that the antirachitic active component has an absorption maximum at 265 mu.

The invention is further illustrated by the following examples without being restricted thereto:

*Example 1.*—31.6 grams of 7-dehydro-cholestrol are dissolved in 400 ccs. of benzene and irradiated in a quartz roller which rotates around a magnesium spark for 5 hours. After distilling off the benzene in vacuo the residue is dissolved in 75 ccs. of pyridine and left standing after the addition of 27 grams of meta-dinitrobenzoylchloride for 24 hours at room temperature. The mixture is then diluted with water. After some time the pyridine-containing water is poured off and the residue washed several times with water and finally with methanol. Then the residue is extracted with about 1 liter of ether and the ethereal solution separated from the undissolved meta-dinitrobenzoate of 7-dehydro-cholesterol which has remained unchanged during the irradiation. The ethereal solution is then washed with 5% oxalic acid, then with caustic soda solution and finally with water, dried over sodium sulfate and the ether evaporated under reduced pressure. The residue is treated with 150 ccs. of acetone, the solution is cooled whereby still slight quantities of 7-dehydro-cholesterol-dinitrobenzoate separate which is filtered with suction and washed with cold acetone and ether. The filtrate is evaporated to dryness under reduced pressure and the residue taken up in 25 ccs. of ether-methanol. After some time, particularly on inoculating the solution with some crystals, crystallization of the vitamin $D_3$-dinitrobenzoate takes place which is completed by letting the solution stand at $+2°$ C. The separated crystals are filtered with suction and washed again with ether-methanol. In this manner 10.7 grams of the crude product melting at 132.5–135° C. are obtained which can be further readily purified by recrystallization. From the mother lyes small quantities of vitamin $D_3$-ester separate.

3.5 grams of the dinitrobenzoate are heated to boiling with 35 ccs. of 5% methylalcoholic caustic potash solution for 20 minutes. The potassium salt of the meta-dinitrobenzoic acid separating is filtered with suction and the filtrate cooled to $-15°$ C. After 24 hours the vitamin $D_3$ has separated in thin needles which are purified by recrystallization from dilute acetone at low temperature.

The vitamin $D_3$ melts at 82–84° C. and has an optical rotary power of $$[\alpha]_D^{22} = +83°$$

(in acetone). It is readily soluble in all organic solvents, insoluble in water and cannot be precipitated with digitonin. It shows a characteristic adsorption maximum at 265 mu (extinction coefficient $\epsilon = 52$).

Example 2.—40 grams of 70-dehydro-cholesterol are irradiated in portions of 10 grams each as indicated in Example 1. The benzene solutions together are concentrated in vacuo to 200 ccs. with the exclusion of air at 50° C. and treated with 60 ccs. of pyridine and 40 grams of 3,5-dinitrobenzoylchloride. The mixture is heated in carbonic acid atmosphere for 2 hours to 90° C. Further working up may take place with the admission of air. The cooled reaction mixture is diluted with 2 liters of ether, worked through very well and filtered with suction. The filter residue is first washed with benzene, then with ether and finally with water. In this manner 15 grams of 7-dehydro-cholesterol-dinitrobenzoate are obtained. The benzene and ether washing solutions are united with the mother lye. The ether-benzene solution is extracted with 5% hydrochloric acid or oxalic acid solution and then with 5% caustic soda solution or sodium carbonate solution, washed neutral with water and dried with sodium sulfate. After evaporating the solvent in vacuo a brown oil is obtained which is boiled with 100 ccs. of acetone, whereby part of the substances remain undissolved. The cooled solution is filtered with suction and the filter residue washed with acetone. In this manner further 2.2 grams of 7-dehydro-cholesterol-dinitrobenzoate are isolated; the irradiation product is then practically free from the dinitrobenzoate of the initial material. The acetone solution is evaporated to dryness in vacuo and the residue taken up in 200 ccs. of normal benzine-benzene in the proportion 4:1. For removing impurities the said solution is conducted under reduced pressure through a column of 40 mm. diameter and about 1 m. length, which contains 1500 grams of a mixture consisting of equal parts of aluminium oxide and quartz sand. The column is rinsed with 3 liters of normal benzine-benzene (4:1). The intensive yellow filtrate is evaporated to dryness in vacuo and the residue taken up in 40 ccs. of acetone, while heating. On cooling, 9 grams of pure dinitrobenzoate of the vitamin melting at 135–136° C. having a rotary power of $$[\alpha]_D^{20} = +97°$$

(in chloroform) crystallize spontaneously. These data do not change on recrystallization. The mother lye, after concentration, yields further 1.4 grams of vitamin ester. On recrystallization from ether the ester melts at 140–141° C. From acetone these crystals melt again at 135° C. The ester is further worked up in accordance with the directions given in Example 1.

Example 3.—10 grams of the 7-dehydro-cholesterol, irradiated as indicated in Example 1, are dissolved in 150 ccs. of 90% alcohol and cooled to $-20°$ C. The crystallized initial material is filtered with suction, washed twice with 25 ccs. each of cooled 90% alcohol and dried in vacuo. The filtrate is heated with a solution of 3 grams of digitonin in 150 ccs. of 90% alcohol and after filtering off and washing of the digitonide-precipitate concentrated to a volume of 100 ccs. After the addition of 400 ccs. of air-free water the solution is thoroughly extracted with petroleum ether. A residue of 6.2 grams is obtained from the united petroleum-ether extracts. The said residue is left standing in ether-petroleum ether with 3 grams of citraconic acid anhydride for 6 days at room temperature. The separation of the reaction mixture into neutral and acid parts proceeds as indicated in Example 1. The neutral fraction, having a weight of 5 grams, is dissolved in benzine-benzene in the proportion 4:1 and, same as in chromatographic adsorption analysis, passed through a column of 500 grams of active aluminium oxide. The middle part of the layer contains the main quantity of the vitamin. The said portion is elutriated with benzene-methanol. After evaporation of the solvent a residue of 2.5 grams remains which is esterified with an equal quantity of 3.5-dinitrobenzoyl-chloride in dry pyridine. The dinitrobenzoic acid ester of the vitamin obtained in this manner can be well crystallized from acetone solution and forms well shaped yellow needles which, after recrystallization from acetone, melt at 129° C. According to analysis they have the formula $C_{34}H_{46}O_6N_2$. By saponification of the crystallized ester the free vitamin is obtained therefrom, which when administered to a rat in daily doses of $0.05\gamma$ is antirachitically active. It may be further purified as indicated in Example 1.

Example 4.—A solution of 10 grams of irradiated 7-dehydro-cholesterol in 50 ccs. of benzene is treated with 3 grams of citraconic acid anhydride and stored for 10 days at ordinary temperature with the exclusion of air. Thereupon the solution is evaporated to dryness in vacuo and the residue dissolved in 200 ccs. of air-free methanol. After the addition of 200 ccs. of 25% methylalcoholic caustic potash solution the whole mixture is heated for 2 hours in a nitrogen atmosphere to 50° C. and left standing for further 16 hours at room temperature. The separated crystallization product which essentially consists of the potassium salt of the addition compound of the initial material is filtered with suction with the exclusion of air and washed with air-free methanol. The filtrate and the methanol are treated with 1600 ccs. of water and three times extracted with 500 ccs. each of low boiling petroleum ether. After the addition of 300 ccs. of 16% sulfuric acid the addition compound of an irradiation product with citraconic acid is precipitated from the alkaline solution. It is filtered with suction, washed with water and dried in vacuo at ordinary temperature. The united petroleum ether solutions are washed with water, dried, filtered and evaporated. The extraction with petroleum ether and the further working up of the petroleum ether solution is carried out with the complete exclusion of air. The residue of the petroleum ether solution, weighing 5 grams, is dissolved in 25 ccs. of air-free benzene and after the addition of 8 ccs. of pyridine and 5 grams of 3,5-dinitro-4-methyl-1-benzoylchloride heated for 2 hours in carbonic acid atmosphere to 75° C. The material worked up in the usual manner is dissolved in 40 ccs. of boiling acetone. After cooling the solution is separated from crystallized 7-dehydro-cholesterol-3,5-dinitro-4-methyl-1-benzoate (melting point 201° C., rotary power $$[\alpha]_D^{20}$$

in chloroform $-43°$). The acetone filtrate is carefully evaporated to dryness in vacuo and the residue dissolved in 100 ccs. of normal benzine. The said solution is filtered through a column of aluminium oxide. The aluminium oxide is mixed with the same quantity of pulverized quartz sand, height of the colum 30 cm., diameter 2 cm. It is rinsed with 100 ccs. of normal benzine. In the filtrate there is 75% of the ester which after careful removal of the solvent is saponified in the usual manner by heating with methylalcoholic caustic potash. The purified product obtained in a yield of 2.7 grams is antirachitically highly active and has an ultra-violet absorption maximum at 265 mu. It may be further purified as indicated above.

We claim:—

1. Antirachitically activated 7-dehydrocholesterol.

2. The non-crystalline intermediately purified antirachitically active transformation product of 7-dehydrocholesterol having in the dry state an activity of about 20,000 "International vitamin D units" per mg., said intermediately purified product being a saponification product of a crystalline nitrobenzoic acid ester.

3. The crystalline antirachitically active transformation product of 7-dehydrocholesterol having the formula: $C_{27}H_{44}O$ which crystalline product melts at 82–84° C., has a rotary power $$[\alpha]_D^{20}+83°$$

in acetone solution and an absorption maximum at 265 mu, one "International unit" of antirachitic activity being contained in 0.025γ.

4. The meta-dinitrobenzoic acid ester of the antirachitically active transformation product of 7-dehydrocholesterol which forms yellow crystals melting at 135–136° C. when recrystallized from acetone, and has a rotation power $$[\alpha]_D^{20}+97°$$

in chloroform solution.

5. In the process of isolating the antirachitically active component of ultra-violet-irradiated 7-dehydrocholesterol, the step which comprises the esterification of the irradiation product by means of a meta-dinitrobenzoylchloride.

6. In the process of isolating the antirachitically active component of ultra-violet-irradiated 7-dehydrocholesterol, the step which comprises the esterification of the irradiation product by means of meta-dinitrobenzoylchloride in the presence of pyridine.

7. The process which comprises esterifying ultra-violet-irradiated 7-dehydrocholesterol by means of meta-dinitrobenzoyl chloride, separating the fraction of the esterification product containing those parts which are more soluble in organic solvents, by fractional recrystallization from organic solvents, saponifying the crystalline meta-dinitrobenzoic acid ester of the antirachitically active transformation product of 7-dehydrocholesterol by means of an alcoholic alkali solution and removing the alkali metal salt of the meta-dinitrobenzoic acid ester which has separated in the saponification mixture.

8. Process as claimed in claim 7, in which digitonin is added to an alcoholic solution of the ultra-violet-irradiation product of 7-dehydrocholesterol to precipitate those components which yield an insoluble digitonin addition compound, and in which process this insoluble addition product is separated prior to the esterification of the product remaining in the filtrate.

9. Process as claimed in claim 7, in which the ultra-violet-irradiated 7-dehydrocholesterol is dissolved in alcohol, the alcoholic solution is cooled to a temperature of $-10$ to $-20°$ C., the crystals separating are filtered off and the substance remaining in the filtrate is subjected to the esterification as specified in claim 7.

10. Process as claimed in claim 7, in which, prior to the esterification step, the ultra-violet-irradiated 7-dehydrocholesterol is treated with a compound of the maleic acid anhydride type, the addition compound formed is saponified with alcoholic alkali solution to split up the acid anhydride, removing the acid components in the form of their salts and subjecting the remaining neutral irradiated component of the mixture to the esterification as specified in claim 7.

11. Process as claimed in claim 7, in which the fractionation of the esterification product is furthered by chromatographic adsorption analysis by conducting the solution of the esterified product through a column of aluminium oxide and extracting the ester of the antirachitically active product from the lower parts of the column with excess solvent.

ADOLF WINDAUS.
FRIEDRICH SCHENCK.

Certificate of Correction

Patent No. 2,099,550.  November 16, 1937.

ADOLF WINDAUS ET AL.

It is hereby certified that errors appear in the printed specification of the above numbered patent requiring correction as follows: Page 1, second column, line 39; page 2, second column, line 63; page 4, first column, line 49; for "mu" read $m\mu$; page 3, first column, line 47, for "70-" read 7-; and that the said Letters Patent should be read with these corrections therein that the same may conform to the record of the case in the Patent Office.

Signed and sealed this 8th day of March, A. D. 1938.

[SEAL]

HENRY VAN ARSDALE,
*Acting Commissioner of Patents.*